June 18, 1957  F. K. KELEMEN ET AL  2,796,513
STUD WELDING APPARATUS

Filed June 27, 1955  2 Sheets-Sheet 1

INVENTORS
Frank K. Kelemen
and
Ralph K. Ritter

BY Brown and Mikulka
ATTORNEYS

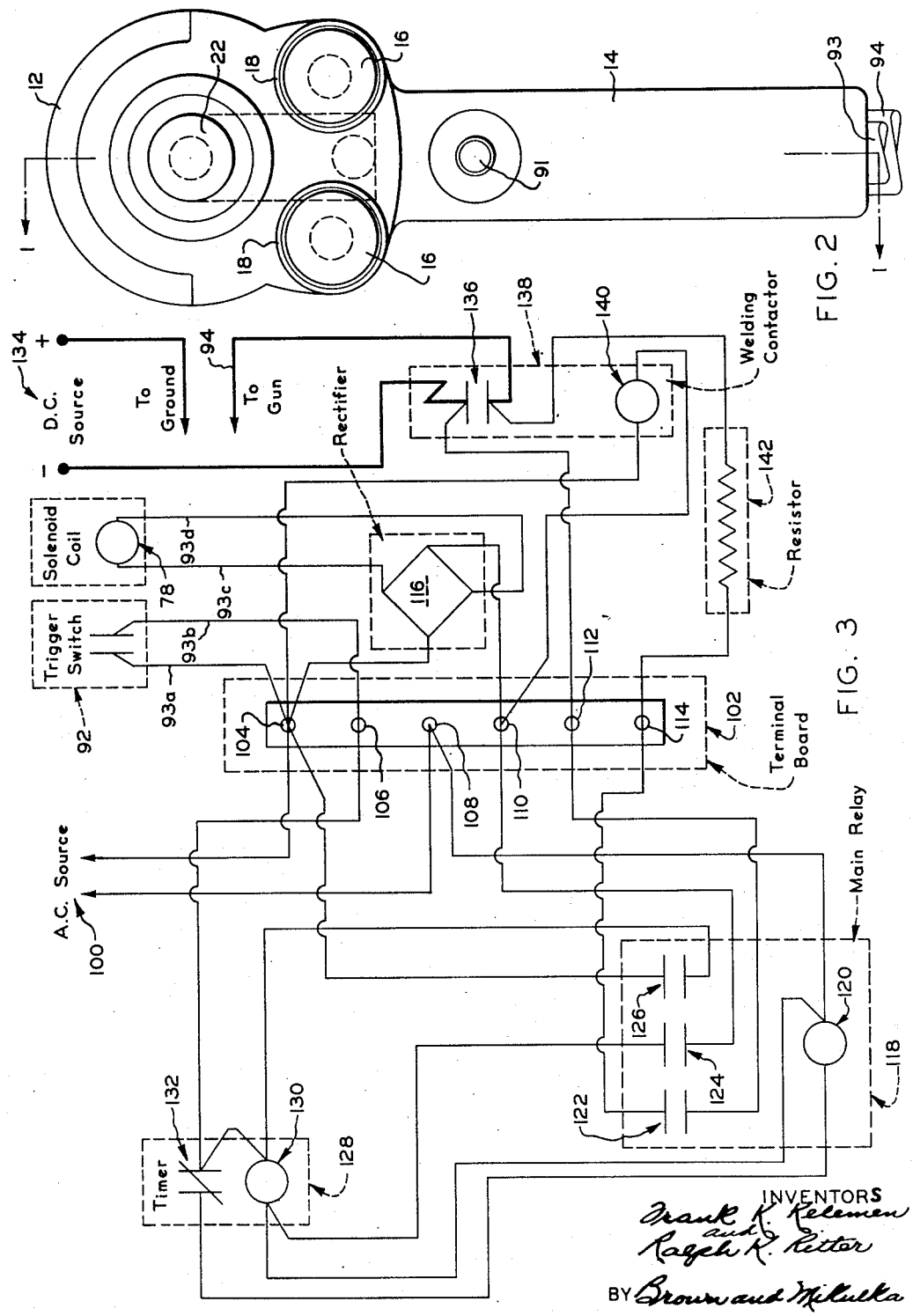

United States Patent Office 2,796,513
Patented June 18, 1957

2,796,513

STUD WELDING APPARATUS

Frank K. Kelemen and Ralph K. Ritter, Haddonfield, N. J., assignors to KSM Products, Inc., Merchantville, N. J., a corporation of New Jersey Application June 27, 1955, Serial No. 518,032

20 Claims. (Cl. 219—98)

This invention relates to electric arc welding, and more particularly to stud welding apparatus equipped with means for more precisely controlling the arc created during the weld cycle.

Stud welding, a form of arc welding in which a metallic stud member is end welded to a metallic body member such as a plate, is ordinarily performed by means of equipment which includes, in addition to a source of electrical energy and suitable timing controls, a stud welding gun which holds and manipulates the stud throughout the weld cycle. The stud may be manually or mechanically inserted into the gun and, initially, is so positioned therein that it protrudes a short distance beyond the position it must assume when it and the gun are in operative position for initiating the welding operation. As a result, the stud is subjected to an initial inward displacement as it is located in operative relation to the body member. Thereafter, and while this engagement is maintained between the stud and the body, a current is passed through these members and almost immediately the stud is subjected to a further displacement which lifts it from its body-engaging position and an arc is thus struck between the stud and the body. This further displacement is characterized as the "lift" whereas the initial displacement is characterized as the "plunge" and together these two represent the total travel available to the stud as it is plunged into contact with the metallic body at the completion of the weld cycle.

It has been long recognized that the reliability of the weld depends, among other factors, on the achievement of a constant lift and in the design of guns this has been an important consideration. It has been proposed, for example, to embody mechanisms which would make lift independent of plunge, and it was assumed that these mechanisms would provide a constant lift. Examples of structures of this kind are those described in the Hughes Patent No. 2,265,169, for Welding Gun, issued December 9, 1941, and the Nelson Patent No. 2,413,189, for Stud Welding Machine, issued December 24, 1946.

The stud welding guns of these patents are equipped with a stud holder and a solenoid for actuating the holder to lift the stud. To connect together the core of the solenoid and the stud holder, each gun is provided with a one-way clutch mechanism which permits relatively free movement between the stud holder and the core when these members are moved toward one another and which locks the two together when they are moved in a direction away from one another. As a result, the stud holder is free to move relative to the core during the aforesaid initial displacement of the stud but is locked in engagement with the core during the lift-actuating movement of the latter. In each structure the core travel is terminated by means of a positive stop and it is assumed that this careful control of the travel of the solenoid core will precisely determine the amount of lift. However, although these arrangements have their intended effect of rendering the lift independent of the plunge, they introduce a variation in the lift which in many cases is as serious or more serious in its effect on the reliability of the welds than the condition which the structure is intended to correct. It has now been determined that the source of this error is the overtravel of the stud holder at the end of the lift. When the motion of the solenoid core is suddenly terminated, the one-way clutch permits the stud holder to continue its travel in the direction of the core. This overtravel, if constant, would pose no problem since a suitable adjustment could be made therefor. However, the overtravel actually varies substantially due to (1) voltage fluctuations, (2) changes in resistance of the solenoid coil with changes in the temperature during duty cycles of appreciable duration, (3) different lift settings, (4) changes in the welding current settings of the welding power source, and (5) normal variation of impact properties of solenoids.

It is accordingly a principal object of the present invention to provide a stud welding gun equipped with means for rendering the lift of the gun independent of plunge while at the same time eliminating the errors due to overtravel existing in prior art structures and thereby providing a complete and precise control of the lift of the stud during the weld cycle.

Another object of the invention is to provide a novel connecting means between the stud holder and its lifting member which is so constituted as to provide for a uniform distribution of the lifting forces whereby a more durable and reliable clutching action is obtained between the lifting member and the stud holder.

A further object of the present invention is to provide a novel stud welding gun structure simple in design, light in weight, reliable in operation, capable of ready and precise adjustment for varying welding conditions, and requiring a minimum of maintenance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is an end elevational view illustrating the front end of the gun; and

Fig. 3 is a wiring diagram illustrating schematically one form of electrical circuit for use in the aforesaid gun.

Figure 1:
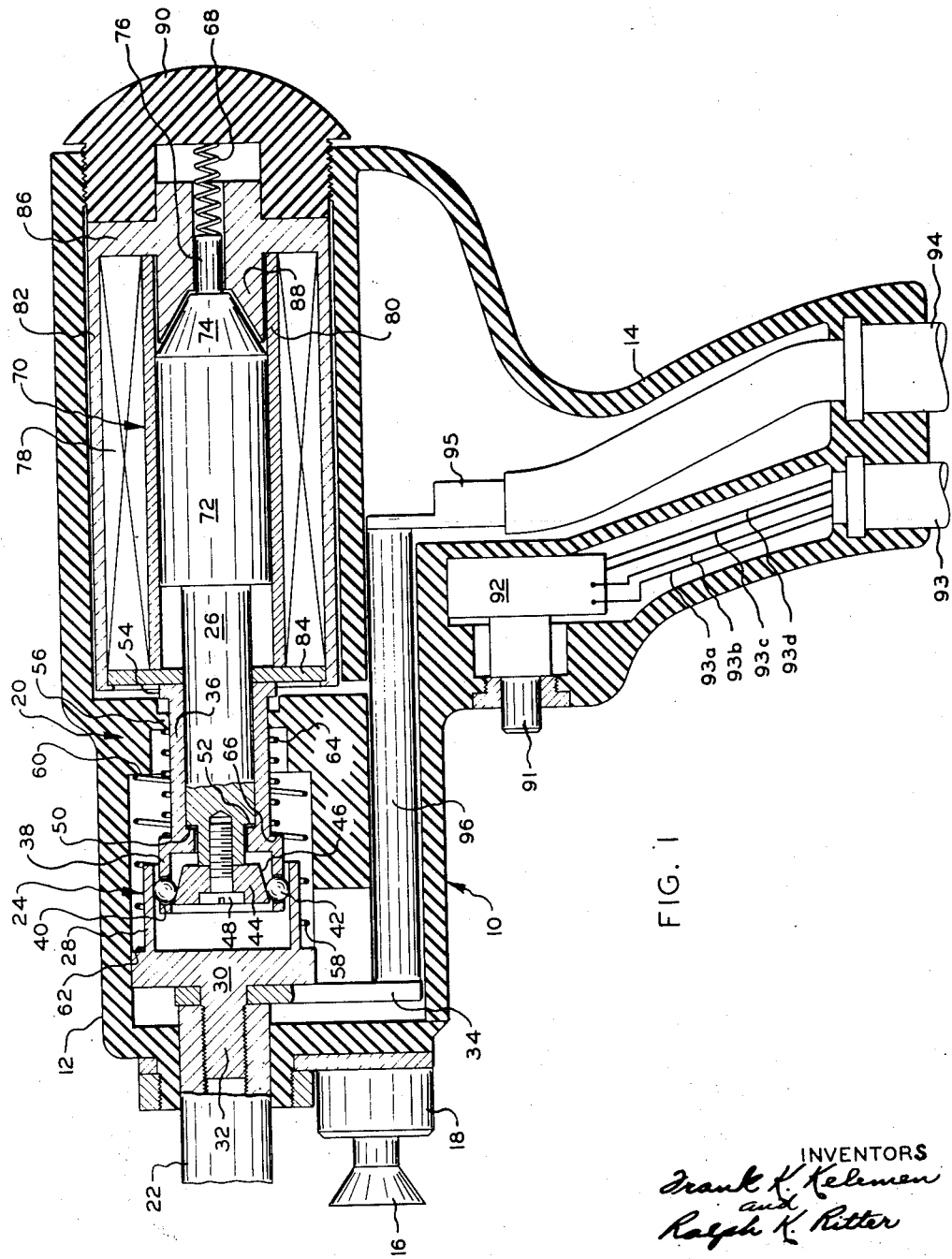
Figure 1 is a view, partly in section and partly in elevation, of one form of welding gun embodying the present invention, the section being taken along the main longitudinal axis of said gun.

The novel stud welding gun structure of the present invention is illustrated by way of example as embodied in a welding gun of the semi-automatic pistol type, although, as will be apparent from the following description, it has utility in all other forms of stud welding equipment where control of lift is important and especially in guns of the automatic and stationary types.

In its preferred form, the gun comprises a main housing or barrel, a stud holder mounted for slidable movement in said housing, a lift-imparting member also slidably movable in said housing and preferably along the same longitudinal axis as said holder, means for actuating said lift-imparting member, and novel clutch means capable of connecting together the lifting member and the stud holder during the lift-imparting movement of said lifting member while permitting substantially unrestricted movement of the stud holder relative to the lifting member prior to the said lift-imparting movement. Novel means are embodied in the structure for cooperating with the said connecting means to prevent any overtravel of the stud holder relative to the lifting member at any stage of the latter so that for a predetermined setting of said mechanism the lift remains constant despite variations in welding conditions of the type noted hereinabove. In the form shown, the lifting member and the means for actuating the same are a core and a solenoid coil arrangement, but it is to be understood that other means may be used to provide the force for effecting the lift of the stud holder, as for example a suitable spring might be utilized for this purpose in lieu of the solenoid coil and cocked prior to each welding operation. The term "lift direction" will be used herein and in the claims to mean movement relative to the gun housing in the direction in which the stud is moved during the creation of an arc, and the term "plunge direction" to mean movement in the direction in which the stud moves when it is plunged into contact with a plate member to complete the weld cycle.

Referring now to the drawings, and specifically to Figs. 1 and 2, the novel gun structure is shown as comprising a main housing 10, preferably formed of an electrically non-conducting material, such as plastic for example, of the thermosetting phenolic type. Housing 10 comprises a generally cylindrical barrel 12 and, in its preferred form, a handgrip or handle 14, and is preferably formed of two or more sections so that it can be easily disassembled to permit ready access to the operating elements contained therein. Slidably mounted in barrel 12, preferably beneath the main longitudinal axis thereof and symmetrically arranged with respect to the plane of said axis, are a pair of leg members 16. These are mounted for ready adjustment to any desired length, and suitable means (not shown) manually operable from the exterior of the gun, as by means of knurled nuts 18, are provided for fixing said legs against movement in any given position thereof.

Barrel 12 is provided with a main longitudinal bore open at both ends and has an intermediate inwardly-extending section 20 which separates said bore into essentially two chambers. Slidably mounted in the front open end of said barrel are stud-holding means 22 which may comprise a chuck adapter, a chuck and a spring, and which operatively mounts the stud and the arc shield. The stud is fixed in the stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28 which is preferably integrally formed with and extends rearwardly from a screw member 30 whose threaded shank 32 is screwed into a threaded bore provided therefor in stud holder 22. Members 30 and 22 are formed of conducting material, preferably a metal such as steel, and barrel 28 is suitably heat-treated so that the internal surface thereof has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with said stud holder 22 and lifting member 26 is a sleeve 36, biased in plunge direction and provided with a forward cylindrical portion 38 of enlarged diameter, said portion being equipped with a plurality of recesses 40 and serving as a cage to operatively mount a plurality of balls 42 in said recesses. Two balls have been shown in Fig. 1 in order to illustrate that a plurality of such balls are carried by the cage 38 and that these are equally spaced around the periphery thereof to provide a uniform distribution of the lifting forces exerted thereby when in operation. Three balls 120° apart constitute a preferred arrangement. Ball cage 38 has an outer diameter which is sufficiently smaller than the internal diameter of the ball-engaging surface of barrel 28 within which it fits to preclude any appreciable surface contact, and the internal diameter of the rear portion of sleeve 36 is sufficiently larger than the external diameter of the portion of the lifting member 26 which it surrounds to prevent any appreciable frictional engagement therebetween.

Rigidly mounted on the forward end of lifting member 26 is a ball-engaging member 44 provided with a tapered ball-engaging peripheral surface 46, the diameter of said surface decreasing in the direction of said lifting member. Member 44 may be secured to or integrally formed with lifting member 26 and, as shown, a screw 48 extending through member 44 and threaded into the end of member 26 effects the desired union between said members.

Balls 42 are adapted to be engaged by tapered surface 46 when the latter is moved in lift direction relative to cage 38 and this engagement forces said balls radially outward into engagement with the internal surface of barrel 28. This tends to lock together the ball-engaging members 44 and 28 and the elements secured thereto, namely, lifting member 26 and stud holder 22 and renders mechanism 24 operative.

An internal shoulder 50 is formed in the forward end of sleeve 36 adjacent cage 38 and is adapted to engage a shoulder 52 in the forward end of member 26 to provide a stop for the movement in plunge direction of lifting member 26 relative to sleeve 36. At the rear end of sleeve 36 an outwardly extending flange 54 is provided and is adapted to engage an inwardly extending flange 56 in intermediate section 20 of the housing in its movement in plunge direction whereby said flange 56 fixes the foremost position of sleeve 36 relative to housing 10.

A main spring 58 normally biases member 30 and stud holder 22 along therewith in a plunge direction, said spring being held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i. e., balls 42 are inoperative to effect frictional engagement between barrel 28 and member 44. Thus, so long as shoulder 52 is held in engagement with shoulder 50, barrel 28 and hence stud holder 22 is free for movement in either direction relative to lifting member 26. A spring 64, located between internal shoulder 56 and an external shoulder 66, provided by the base of ball cage 38, normally biases sleeve 36 in a plunge direction. A further spring 68, which exerts a sufficient biasing force upon lifting member 26 to overcome the weight thereof, urges said member in a plunge direction so that normally shoulder 52 engages shoulder 50 and maintains connecting mechanism 24 inoperative.

Suitable means are provided in the gun structure to apply a lifting force to member 26 and in the form shown said means comprise a solenoid 70. Lifting member 26 is the movable core of said solenoid and includes a portion 72 of enlarged diameter, a tapered portion 74 and a rear portion 76 of diminished diameter. Surrounding movable core 26 is the solenoid coil 78 which is housed in a metallic structure comprising an internal cylindrical sleeve 80, for example of brass, an external sleeve 82, for example of steel, a front plate 84, a rear wall 86 and a stationary core 88. Stationary core 88, rear wall 86 and outer sleeve 82 may be integrally formed and this integral structure is preferably provided with an internal bore that slidably receives core portion 76.

A cap member 90 threads into the opening at the rear of gun barrel 12, said member 90 being preferably formed of an electrically non-conducting material as, for example, the same plastic material from which the gun housing is formed. Spring 68 which biases movable core 26 in a plunge direction is preferably mounted between the end of said reduced portion 76 of the movable core and the inner wall of said cap 90. Cap 90 is preferably secured to stationary core 88 and rear wall 86 so that said cap, stationary core 88, wall 86 and sleeve 82 move as a unit. However, plate 84, inner sleeve 80 and solenoid coil 78 are free to move angularly with respect to the remainder of the solenoid housing but are restrained by outer sleeve 82 so as to move axially along with said outer sleeve. Plate 84 abuts against one end of inner sleeve 80 and the other end of said sleeve abuts against wall 86 so that the axial position of the front surface of plate 84 is precisely fixed in the gun housing in relation to the stationary core 88 of the solenoid and the axial position of plate 84 may be controlled by adjusting the position of cap member 90. By mounting plate 84 and solenoid coil 78 so that the latter are not rotated along with sleeve 82, adjustment of cap 90 leaves unaffected the electrical connections which are made to the solenoid coil through plate 84 despite the rotation of sleeve 82.

To precisely control the lift of the stud and prevent overtravel of stud holder 22 relative to lifting member 26, sleeve 36 is so formed and mounted in relation to lifting member 26 and stationary core 88 that during the lift the end of said sleeve 36 engages plate 84 and is positively stopped thereby before the end of movable core 74 engages stationary core 88. It is to be observed that adjustment of the total lift may be obtained by adjusting the position of plate 84 by means of cap 90 but that such adjustment does not affect the aforementioned sequence of operations because the axial position of plate 84 is fixed relative to the axial position of stationary core 88. By having sleeve 36 engage and be positively stopped before lifting member 26 engages any stops, the stopping force is transmitted through said sleeve to balls 42 in a direction which tends to augment the wedging action between the plate-engaging surfaces of elements 44 and 28. Stud holder 22 is thus rigidly secured through member 30, balls 42 and member 44 to lifting member 26 and any overtravel of holder 22 relative to member 26 is prevented.

Disposed in handgrip 14 of the housing, in a position to be readily engaged by the finger of the gun operator, is a trigger in the form of a push button 91 which, when depressed, is adapted to actuate a control switch 92. A pair of electrical cables 93 and 94 preferably extend through the bottom of the handgrip into the housing to effect the necessary electrical connections. Cable 94 provides the welding current and is connected by means of a connector element 95 to a conducting rod 96 which in turn is affixed to and makes contact with conductor 34. The structure comprising conductor 34, rod 96 and connector 95 is freely movable longitudinally of the gun barrel 12 along with stud holder 22, cable 94 being sufficiently flexible and having enough play in the gun handle to permit such free movement. Cable 93 carries four control wires 93a, 93b, 93c and 93d, wires 93a and 93b being connected to switch 92 and wires 93c and 93d extending upward through the gun housing to connect with solenoid coil 78 through plate 84.

The gun of Fig. 1 is shown in lift position with flange 54 engaging plate 84 and mechanism 24 locked in operative position. However, at the beginning of the stud welding cycle, stud holder 22 is in its foremost position in plunge direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58 and is so displaced initially as the stud and arc shield held by holder 22 are positioned in engagement with the plate or other body member to which the stud is to be secured. Thereafter, by depressing trigger 91 the welding cycle is begun and the energization of solenoid 78 moves member 26 in a lift direction while sleeve 36 continues to be biased in plunge direction by its spring 64. As a result, when lifting member 26 has moved a predetermined, constant short distance in lift direction, balls 42 frictionally engage and are wedged between the surface 46 of member 44 and the internal surface of barrel 28. This locks together lifting member 26 and stud holder 22 and begins the lift of the latter. The lift is terminated when the end of flange 54 of sleeve 36 abuts against plate 84 and renders more positive the locking engagement between the stud holder 22 and the lifting member 26. The elements are so held as long as solenoid 78 remains energized.

Upon the deenergization of the solenoid coil, stud holder 22, sleeve 36 and lifting member 26 are moved in a plunge direction under the influence of their respective springs and the stud held by said holder is plunged into engagement with the body member, completing the weld cycle.

The novel controls and connecting circuits for the gun structure are shown diagrammatically in Fig. 3. As shown, said controls comprise an A. C. source 100, a control or terminal board 102 comprising six terminals 104, 106, 108, 110, 112 and 114, said A. C. source being connected across terminals 104, 108 of said board. Trigger switch 92 of the gun is connected to terminals 104 and 106 of the board and a full wave rectifier 116 has two terminals thereof connected to terminals 104, 110, respectively, of said board and the other two terminals connected to solenoid coil 78. A main control electromagnetic relay 118 is provided and comprises actuating coil 120 and relay switches 122, 124 and 126 having normally open contacts and adapted to be closed upon energization of said coil. The contact points of switch 122 are so adjusted in relation to those of switches 124 and 126 that upon energization of coil 120 switch 122 will close a predetermined short interval before switches 124 and 126. A timing means 128, for example of the electropneumatic type, is included in the circuit and comprises coil 130 and a normally closed switch 132 so connected to coil 130 by suitable pneumatic means as to be opened a predetermined time after said coil is energized. It is to be noted that coil 120, which controls switches 122, 124 and 126, is connected to the source of alternating current via terminals 108 and 104, switch 92 and switch 132, and coil 130 is connected to the A. C. source via terminal 106, switch 92 and terminals 104 and 108. This gives a positive control over the timing of the welding cycles as will appear more fully hereinafter.

To provide the welding current, a source of energy 134 has one of its terminals connected to ground and the other connected through a switch 136 to the welding gun, as by means of cable 94. Switch 136 is the switch means of a welding contactor 138 which includes coil 140, of the time-delayed type, adapted to close the contact points of switch 136 a very short interval after it is energized, said coil being connected to terminals 104 and 110 of the terminal board. Accordingly, the closing of contact points 124 energizes coil 140 and closes switch 136 and makes available to the welding gun the full welding current from source 134. To provide a current of lesser magnitude which serves to produce a pilot arc just immediately prior to the flow of the full welding current, a circuit comprising resistor 142 and switch 122 is connected across the terminals of switch 136. As a result, when switch 122 closes, which, as hereinabove noted, occurs just prior to the closing of switch 124, a current of diminished magnitude, due to the presence of resistor 142, is caused to flow from source 134 to the gun. It is also to be noted that the closing of switch 126 creates a circuit in parallel with trigger switch 92 which maintains the flow of current through coil 120 even if the operator releases the trigger.

In operation, therefore, the operator actuates trigger 91 (Fig. 1) and closes switch 92 causing current to flow from source 100 to magnetic relay 118 energizing coil 120 thereof. Switch 122 is first closed and, as noted above, effects a connection through resistor 142 to the source of welding current and provides energy for a pilot arc. Shortly thereafter, switches 124 and 126 close, The closing of switch 124 closes the circuit from the A. C. source to rectifier 116 supplying direct current to the solenoid coil 78 and initiating the lift of the stud. Simultaneously coil 140 is energized through the same switch 124 and shortly thereafter closes switch 136 thus short circuiting the pilot circuit through resistor 142 so that after the lift begins the full welding current becomes available to the gun to create an arc of full intensity.

At the end of the interval for which timer 128 is set, switch 132 opens, breaking the circuit through and deenergizing coil 120. This opens switches 122, 124 and 126 and thereby, in turn, deenergizes the solenoid coil and interrupts the flow of welding current to the gun including that through the pilot circuit. The stud holder is thus rendered free to move under the force of the main spring of the gun in plunge direction to complete the weld cycle. It is significant in this respect that the opening of switch 132 is effective to terminate the weld cycle even if the operator has continued to maintain trigger switch 92 closed.

It is to be noted that in order to avoid any possibility of a premature flow of full welding current which might create a resistance weld, welding contactor 138 of the foregoing circuit is of the time-delayed type. A more conventional type of contactor without a built-in delay could also be used in which case there is interposed in the circuit, between this contactor and switch 124, a supplementary relay switch which is adapted to be actuated by the closing of switch 124 and which, when actuated, operates the said welding contactor. This extra relay switch introduces the minute delay between the actuation of solenoid coil 78 and the closing of the contact points of the welding contactor which is desired in order to preclude a premature flow of the full welding current.

A significant novel feature of this circuit, which is covever by copending application Serial No. 518,035 in the name of Lawrence P. English, filed concurrently herewith, entitled "Stud Welding Circuit," is the inclusion therein of a D. C. rectifier, such as rectifier 116, which makes possible the use of an independent A. C. control circuit without any of the disadvantages which derive from a direct application of alternating current to the operation of a solenoid coil. For example, as noted hereinabove, to successfully prevent the overtravel of stud holder 22 is essential that sleeve 36 be positively stopped before movable core 76 of the solenoid engages stationary core 88. This requires that there be, in the lift position of the solenoid, a spacing between the movable and the stationary solenoid cores, a condition which is difficult to achieve without chatter or similar deleterious effects in an A. C. solenoid coil. This disadvantage has been avoided by the novel expedient of including a rectifier between the source of alternating current and the solenoid coil while rendering the operation of the coil more precise because it is independent of the fluctuations of the direct current which exists when the solenoid is connected directly to the source of welding current.

There is thus provided one form of a novel stud welding apparatus which provides a simple and yet completely reliable control of the lift of the stud. In the form shown, said control means is associated with a connecting mechanism comprising a plurality of balls which provide a uniform distribution of the lifting forces which surround the axis of the lifting member. However, it is to be understood that the former feature of the invention is not limited to use with connecting means of this kind but can be adapted for other structures for engaging the clutching members thereof to positively stop the motion of the stud holder in lift direction and thereby avoid the lift variations ordinarily occurring in such structures due to overtravel of the stud holder.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:

1. In a stud welding apparatus, in combination, a stud-holding means mounted for movement in lift and plunge directions, means normally biasing said stud-holding means in plunge direction, a lift-imparting member, means normally biasing said lift-imparting member in plunge direction, actuating means for moving said lift-imparting member against the bias of said last-named biasing means in a lift direction, means for connecting together said stud-holding means and said lift member so that movement of said lift member in a lift direction moves said stud-holding means along therewith, and means for engaging said connecting means to simultaneously stop the travel in lift direction of said stud-holding means and said lift member.

2. In a stud welding apparatus, in combination, a stud-holding means mounted for movement in lift and plunge directions, means normally biasing said stud-holding means in plunge direction, a lift-imparting member, means normally biasing said lift-imparting member in plunge direction, actuating means for moving said lift-imparting member against the bias of said last-named biasing means in a lift direction, means for connecting together said stud-holding means and said lift member so that movement of said lift member in a lift direction moves said stud-holding means along therewith, and stop means for engaging said connecting means at a predetermined point in the travel thereof in lift direction to terminate said travel and increase the force with which said connecting means secures together said stud-holding means and said member thereby precluding overtravel of said stud-holding means relative to said member and accurately determining the lift of said stud-holding means.

3. In a stud welding apparatus, in combination, a stud-holding means mounted for movement in lift and plunge directions, means normally biasing said stud-holding means in plunge direction, a lift-imparting member, means normally biasing said lift-imparting member in plunge direction, actuating means for moving said lift-imparting member against the bias of said last-named biasing means in a lift direction, means for connecting together said stud-holding means and said lift member so that movement of said lift member in a lift direction moves said stud-holding means along therewith, and means for engaging said connecting means at a predetermined point in the travel thereof in a lift direction to terminate said travel and keep said lift member and said stud-holding means secured together against relative movement so long as there is applied to said lift member a force tending to continue the movement thereof in a lift direction.

4. A stud welding apparatus comprising, in combination, a housing, stud-holding means mounted in said housing for movement in lift and plunge directions, means normally urging said stud-holding means in plunge direction, lifting means comprising a lifting member mounted for movement in lift and plunge directions, actuating means for moving said member in lift direction, means for connecting together said stud-holding means and said lifting member for movement together in lift direction, said connecting means being normally inoperative and becoming operative upon a predetermined movement of said lifting member in lift direction relative to said stud-holding means, and stop means for engaging said connecting means at a predetermined point in the travel thereof in lift direction to terminate said travel and increase the force with which said connecting means secures together said stud-holding means and said member thereby precluding overtravel of said stud-holding means relative to said member and accurately determining the lift of said stud-holding means.

5. The stud welding apparatus of claim 4 wherein said connecting means comprises at least one clutch element for frictionally engaging a surface of said stud-holding means and a surface of said lifting member, and a mounting member for carrying said clutch element, said stop means for cooperating with said connecting means comprising a stop adapted to engage said mounting member so as to urge said clutch element into stronger frictional engagement with said surfaces.

6. The stud welding apparatus of claim 5 wherein a plurality of said clutch elements are provided and are equally spaced circumferentially around said mounting member.

7. The stud welding apparatus of claim 4 wherein said lifting member is a movable solenoid core and said actuating means comprises a solenoid coil and a stationary solenoid core.

8. The stud welding apparatus of claim 7 comprising a means accessible for manual operation exteriorly of said housing for effecting corresponding adjustments in the position of said means for stopping the lift movement of said stud-holding means and in the position of said stationary core.

9. A stud welding apparatus comprising a housing, stud-holding means slidably mounted in said housing for movement in lift and plunge directions, resilient means normally urging said stud-holding means in plunge direction, a lifting member mounted in said housing for movement in lift and plunge directions, resilient means normally biasing said lifting member in plunge direction, actuating mechanism capable, when rendered operative, of moving said lifting member in lift direction, means for connecting together said stud-holding means and said lifting member, said connecting means being inoperative when said actuating mechanism is inoperative and becoming operative upon movement of said lifting member in lift direction, said connecting means comprising a first element secured to said stud-holding means and providing a first friction surface, a second element secured to said lifting member and providing a second friction surface, a clutch mounting member movably mounted in said housing and having at least a portion thereof located between the aforesaid first and second friction surfaces, at least one clutch element carried by said portion of said clutch mounting member, movement of said second element relative to said clutch mounting member causing said clutch element to frictionally engage said surfaces and render said connecting means operative to connect together said stud-holding means and said lifting member, and means for engaging said clutch mounting member at a predetermined point in the travel thereof in lift direction to terminate the movement in lift direction of said stud-holding means.

10. A stud welding apparatus comprising a housing, stud-holding means slidably mounted in the forward end of said housing for movement in lift and plunge directions, resilient means normally urging said holding means in plunge direction, a lifting member mounted in said housing to the rear of said stud-holding means for movement in lift and plunge directions essentially along the same axis as said stud-holding means, resilient means for biasing said lifting member in plunge direction, actuating mechanism capable, when rendered operative, of moving said lifting member in lift direction, means for connecting together said stud-holding means and said lifting member, said connecting means being inoperative when said actuating mechanism is inoperative and becoming operative upon movement of said lifting member in lift direction, said connecting means comprising a clutch mounting member movable in said housing essentially along the same axis as said stud-holding means and said lifting member and at least one clutch element carried by said clutch mounting member and adapted, upon movement of said lifting member in lift direction relative to said clutch mounting member, to effect frictional engagement between said lifting member and said stud-holding means, and means for engaging said clutch mounting member at a predetermined point in the travel thereof in lift direction to stop said travel and increase the frictional engagement between said clutch element, said lifting member and said stud-holding means thereby also simultaneously stopping the lift movement of the said lifting member and said stud-holding means.

11. A stud welding gun comprising, in combination, a housing, stud-holding means mounted in said housing for movement in lift and plunge directions, means normally urging said stud-holding means in plunge direction, lifting means comprising a lifting member mounted for movement in lift and plunge directions, actuating mechanism for moving said lifting member in lift direction, means for connecting together said stud-holding means and said lifting member, said connecting means comprising a clutch mounting member movably mounted in said housing and having at least a portion thereof located between said lifting member and said stud-holding means, at least one clutch element carried by said portion of said clutch mounting member, lift movement of said lifting member relative to said clutch mounting means rendering said clutch element operative to frictionally connect together said stud-holding means and said lifting member, and means for engaging said clutch mounting member to stop the movement thereof without disengaging said stud-holding means and said lifting member from said clutch element to thereby stop the lift movement of said stud-holding means.

12. A stud welding gun comprising, in combination, a housing, stud-holding means mounted in said housing for movement in lift and plunge directions, means normally urging said stud-holding means in plunge direction, a lifting member mounted for movement in lift and plunge directions, actuating mechanism for moving said member in lift direction, means for connecting together said stud-holding means and said lifting member, said connecting means comprising a clutch mounting member movable in said housing essentially along the same axis as said stud-holding means and said lifting member and at least one clutch element carried by said clutch mounting member and adapted, upon movement of said lifting member in lift direction relative to said clutch mounting member, to effect frictional engagement between said lifting member and said stud-holding means, and means for engaging said clutch mounting member at a predetermined point in the travel thereof in lift direction to stop said travel and increase the frictional engagement between said clutch element, said lifting member and said stud-holding means thereby also simultaneously stopping the lift movement of said lifting member and said stud-holding means.

13. The stud welding apparatus of claim 12 comprising a plurality of clutch elements carried by the clutch mounting member, said elements being equally spaced circumferentially about the axis of movement of said clutch mounting member.

14. A stud welding apparatus comprising a housing, stud-holding means mounted in said housing for movement in lift and plunge directions, means normally urging said stud-holding means in plunge direction, lifting means comprising a lifting member mounted for movement in lift direction and in plunge direction, actuating mechanism for moving said member in lift direction, means for connecting together said stud-holding means and said lifting member, said connecting means being normally inoperative and becoming operative upon movement of said lifting member in lift direction relative to said stud-holding means, said connecting means comprising at least one clutch element for frictionally engaging a surface of said stud-holding means and a surface of said lifting member when said connecting means is operative, a mounting member for operatively mounting said clutch element, said mounting member being free for limited movement relative to said stud-holding means and said lifting member when said connecting means is inoperative, and stop means for engaging said connecting means at a predetermined point in the travel thereof in lift direction to terminate said travel, said stop means being adapted to act on said mounting member for said clutch element to increase the force with which said element secures together said stud-holding means and said lifting member.

15. The stud welding apparatus of claim 14 wherein one of said surfaces engaged by said clutch element is inclined with respect to the other.

16. The apparatus of claim 15 wherein said connecting means comprises a plurality of clutch elements equally spaced circumferentially around the axis of movement of said mounting member and all carried by the latter.

17. A stud welding apparatus comprising, in combination, a housing, stud-holding means mounted in said housing for movement in lift and plunge directions, means normally urging said stud-holding means in plunge direction, lifting means comprising a lifting member mounted for movement in lift and plunge directions, an actuating mechanism for moving said member in lift direction, and means for connecting together said stud-holding means and said lifting member, said connecting means being inoperative when said actuating mechanism is inoperative and becoming operative upon a predetermined movement of said lifting member in lift direction and comprising a first element secured to said stud-holding means and providing a first friction surface, a second element secured to said lifting member and providing a second friction surface, said second friction surface being inclined in plunge direction toward said first friction surface, a clutch mounting member movably mounted in said housing and having at least a portion thereof located between the said first and second friction surfaces, a plurality of clutch elements carried by said portion of said clutch mounting member and spaced at equal distances around the periphery of said clutch mounting member, movement of said lifting member relative to said clutch mounting member causing said clutch elements to frictionally engage said surfaces and to secure together said stud-holding means and said lifting member.

18. The stud welding apparatus of claim 17 wherein the said clutch elements are a plurality of balls.

19. The stud welding apparatus of claim 17 wherein said portion of said clutch mounting element which carries said balls is cylindrical in shape and has its axis substantially coinciding with the axis of movement of said lifting member.

20. The product of claim 19 wherein said first friction surface is cylindrical and said second friction surface is frustoconical, and said surfaces and said mounting member have a substantially common axis.

References Cited in the file of this patent

UNITED STATES PATENTS

| | | |
|---|---|---|
| 2,191,494 | Nelson | Feb. 28, 1940 |
| 2,265,169 | Hughes et al. | Dec. 9, 1941 |
| 2,413,189 | Nelson | Dec. 24, 1946 |